United States Patent [19]

Dubrovsky et al.

[11] Patent Number: 5,104,445
[45] Date of Patent: Apr. 14, 1992

[54] PROCESS FOR RECOVERING METALS FROM REFRACTORY ORES

[75] Inventors: Michael Dubrovsky, El Cerrito; Paul J. Marcantonio, San Rafael, both of Calif.

[73] Assignee: Chevron Research & Technology Co., San Francisco, Calif.

[21] Appl. No.: 523,822

[22] Filed: Feb. 8, 1990

Related U.S. Application Data

[63] Continuation of Ser. No. 80,023, Jul. 31, 1987, abandoned.

[51] Int. Cl.$^5$ .............................................. C01B 17/06
[52] U.S. Cl. .................................. 75/585; 423/22; 423/59; 423/263; 423/491
[58] Field of Search ............... 75/585; 423/22, 491, 423/263, 59; 204/11, 66

[56] References Cited

U.S. PATENT DOCUMENTS

| | | | |
|---|---|---|---|
| 490,193 | 1/1893 | French | 423/29 |
| 589,959 | 9/1897 | Crooke | 75/21 |
| 607,287 | 7/1898 | Sinding-Larsen | 204/111 |
| 927,046 | 7/1909 | Hogel | 75/113 |
| 1,049,746 | 1/1913 | Malm | 423/40 |
| 1,185,817 | 6/1916 | Malm | 75/113 |
| 1,364,804 | 1/1921 | Rankin | 423/53 |
| 1,883,234 | 10/1932 | Lenox et al. | 75/86 |
| 2,642,339 | 6/1953 | Sawyer | 23/200 |
| 2,895,796 | 7/1959 | Hill | 23/87 |
| 3,069,254 | 12/1962 | Grueneau | 75/82 |
| 3,092,456 | 6/1963 | Nelson et al. | 23/200 |
| 3,376,112 | 4/1968 | Dunn et al. | 23/219 |
| 3,537,961 | 11/1970 | White et al. | 204/107 |
| 3,642,454 | 2/1972 | Nylander | 23/297 |
| 3,652,219 | 3/1972 | Peters et al. | 23/200 |
| 3,791,812 | 2/1984 | Frank et al. | 75/9 |
| 3,802,870 | 4/1974 | Bell | 75/82 |
| 3,825,651 | 7/1974 | Heinen et al. | 423/44 |
| 3,834,896 | 9/1974 | Eisele et al. | 75/112 |
| 3,880,650 | 4/1975 | Pemsler | 75/72 |
| 3,894,927 | 7/1975 | Kane | 204/64 |
| 3,899,322 | 8/1975 | Yosim | 75/65 |
| 3,906,074 | 9/1975 | Spreckelmeyer | 423/40 |
| 3,938,989 | 2/1976 | Bell | 75/82 |
| 3,966,888 | 6/1976 | Braithwaite et al. | 423/498 |
| 3,979,265 | 9/1976 | Fonseca | 204/105 |
| 3,983,224 | 9/1976 | Allain et al. | 423/498 |
| 3,988,415 | 10/1976 | Barr | 423/22 |
| 3,988,417 | 10/1976 | Polinsky | 423/40 |
| 3,992,507 | 11/1976 | Cardwell et al. | 423/51 |
| 3,994,720 | 11/1976 | Dubeck | 423/32 |
| 4,011,146 | 3/1977 | Coltrinari et al. | 204/66 |
| 4,038,066 | 7/1977 | Bell | 75/29 |
| 4,110,106 | 8/1978 | Frankiewicz | 75/1 R |
| 4,144,056 | 3/1979 | Kruesi | 75/111 |
| 4,179,492 | 12/1979 | Kruesi | 423/263 |
| 4,209,501 | 6/1980 | Kruesi | 423/491 |
| 4,353,740 | 10/1982 | Dunn | 75/83 |
| 4,362,607 | 12/1982 | Ritcey et al. | 204/108 |
| 4,420,380 | 12/1983 | Ducati | 204/66 |
| 4,500,498 | 2/1985 | Kruesi et al. | 423/100 |
| 4,551,213 | 11/1985 | Wilson | 204/111 |
| 4,576,812 | 3/1986 | von Hahn | 423/491 |
| 4,612,171 | 9/1986 | Holmström | 423/22 |
| 4,613,365 | 9/1986 | Berg | 75/83 |

FOREIGN PATENT DOCUMENTS

56-75538  6/1981  Japan .

OTHER PUBLICATIONS

D. Delarue, "Behavior of Oxides and of Metal Sulfides in LiCl-KCl Molten Eutectic," Chimie Analytique, vol. 44, No. 3 (Mar. 1982).

M. C. Campbell & G. M. Ritcey, "Applications of Chlo- (List continued on next page.)

*Primary Examiner*—Peter D. Rosenberg
*Attorney, Agent, or Firm*—Burns, Doane, Swecker & Mathis

[57] ABSTRACT

The present invention is a process to recover metals from refractory ores. It involves the chlorination of an ore concentrate in the presence of solid salt at a temperature between 300° and 650° C. Thereafter, an oxidation step can be used to convert iron chloride to iron oxide. Subsequent separation steps remove the salt, gangue, and iron oxides. Separate pathways are described for precious and base metal recovery.

53 Claims, 3 Drawing Sheets

OTHER PUBLICATIONS

J. B. Rivarola et al, "Recovery of Platinum from Spent Catalysts of Naphthas Reforming", Lat. Am. J. Chem. Eng. Appl. Chem. (1981), pp. 47-52.

B. R. Palmer et al, "Recovery of Gold by High-Temperature Chlorination", pp. 1-35.

M. Yoshinaga et al, "Tec-Kowa Pelletizing Chlorination Process, its Establishment and Development", The Metallurgical Society, Inc. (1985), pp. 221-238.

M. N. Zyryanov et al, "Importance of Optimum [Chemical] Form of Iron in the Chlorine-Sublimation Treatment of Refractory Gold-Bearing Concentrates", Tsvetnye Metally, 44, pp. 34-35 (1971).

A. L. Engel et al, "Chloride Volatization and Other Tests on a Gold-Copper Ore", Report of Investigations 4612, U.S. Department of the Interior (Dec. 1949).

H. Monk et al, "Purification of Zinc Chloride Produced by Chlorination of Zinc Sulphide Ore", 82 Section C of the Transactions of the Institution of Mining & Metallurgy 161 (1973).

K. Adam et al, "Thermogravimetric Investigation of the Oxidation Behaviors of Some Common Metal Chlorides", Minerals and Metallurgical Processing (Nov. 1984), pp. 190-196.

A. W. Henderson et al, "Dechlorination of Ferric Chloride with Oxygen", Metallurgical Transactions vol. 3 (Oct. 1972) pp. 2579-2583.

G. L. Hundley et al., "Oxidation of Mixed Iron and Copper Chlorides", Bureau of Mines, Report of Investigations 7970 (1974).

S. Fukushima et al, "Mitsubishi Process for Upgrading Ilmenite and Chlorine Recirculation", Paper No. A7-4-48, The Metallurgical Society of AIME, pp. 443-466.

ride Metallurgy to Base-Metal Sulphide and Uranium Ores at Canmet," Extractive Metallurgy Proceedings, pp. 76-90 (1981).

D. H. Yee et al, "Chlorination of Chalcopyrite", Bureau of Mines Report of Investigations (1977), U.S. Department of the Interior.

T. Mukherjee et al, "Base Metal Resource Processing by Chlorination," Mineral Processing Technology Review (1983) vol. 1, pp. 111-153.

Titi-Manyaka et al, "Thermogravimetric Investigation of the Chlorination Behaviors of Some Common Metals and Their Oxides," Society of Mining Engineers, AIME, vol. 252 (Sep. 1972) pp. 307-314.

Titi-Manyaka et al., "Chlorination Behaviors of Some Metal Sulfides as Investigated by Thermogravimetric Analysis" Society of Mining Engineers, AIME, vol. 254 (Mar. 1973) pp. 37-42.

PROCESS FOR RECOVERING METALS FROM REFRACTORY ORES

This application is a continuation of application Ser. No. 080,023, filed Jul. 31, 1987, now abandoned.

BACKGROUND OF THE INVENTION

The present invention is a process for the recovery of metals from sulfide ores. More specifically, the process of the present invention relates to the conversion of precious and base metal sulfides to metal chlorides and subsequent recovery of the precious and base metals.

Worldwide there are many ores in which precious and/or base metals are finely intergrown, dispersed or encapsulated within complex sulfide ores. The extraction of metals from these types of ores is either very complicated, expensive, or otherwise not feasible by conventional technology. Thus, incentives exist to develop a process that may economically process such ores.

Precious metal ores that contain platinum group metals (PGMs), gold, and silver are usually associated with sulfide minerals of copper, nickel, and iron. Conventionally, these ores are smelted to separate the sulfide minerals from the gangue. Upon smelting, the sulfide minerals and the precious metals collect in a separate molten phase, known as matte while the gangue separates as a molten slag. After smelting, the slag is discarded, the matte is cooled, crushed, ground, and leached with sulfuric acid in an autoclave to remove the base metals. The remaining solid residue, often referred to as "leach residue", is further leached with hydrochloric acid and chlorine to recover the precious metals. This process suffers from at least the following major disadvantages: (1) it generates sulfur dioxide which requires expensive gas treating equipment to limit atmospheric emissions; (2) it is long and tedious; and (3) it does not completely dissolve leach residue which must be resmelted.

Other precious metal ores (besides PGMs) that are difficult to treat are gold and silver refractory ores. In refractory gold ores the gold is finely disseminated in a pyritic mineral and cannot be treated by conventional methods, the easiest example of which is direct cyanidation. The gold ore must be treated first. For example, the ore is roasted or leached in an autoclave under oxygen pressure to fully oxidize pyrites. Then, the solid residue from the roasting can be leached with cyanide solutions to recover gold. Depending on the ore and the success of the roasting or autoclaving, gold recovery may vary between 80–95%.

Base metal containing sulfide ore is also processed by smelting. Conventional base metal smelting requires the formation of substantially pure concentrates of individual metals from the metal containing minerals. Complex copper, lead, and zinc bearing pyrite ores produce these pure concentrates at the expense of selectivity and recovery. Economically, it is more desirable to use bulk concentrates which contain a variety of metals because they are less costly to make and can yield higher recoveries. However, conventional metallurgical processes cannot economically treat these bulk concentrates to recover base metals.

Metals within sulfide ores can also be recovered by chlorination. Generally, metals recovery processes that employ chlorination reactions break down into three groups: gaseous chlorination; salt chlorination (in the absence of chlorine gas); or chlorination in a molten salt bath in the presence of chlorine gas. For example, U.S. Pat. Nos. 4,011,146 to Coltrinari et al and 4,362,607 to Ritcey et al teach gaseous chlorination; U.S. Pat. No. 1,883,234 teaches chlorination by salt addition; and U.S. Pat. No. 4,209,501 to Kruesi discloses a molten salt extraction. Furthermore, gaseous chlorination has also been suggested for precious metal recovery, see U.S. Pat. Nos. 4,353,740 to Dunn; 3,825,651 to Heinen et al, and 3,988,415 to Barr.

As explained in H. Parson's "Low Temperature Dry Chlorination of Sulfide Ores —A Review," CIM Bull. Vol. 71, 196 (March 1978), the reaction between chlorine gas and metal sulfides has been known at least since the early part of the century. For example, see U.S. Pat. No. 1,388,086 issued Aug. 16, 1921 to Ashcroft. Many researchers have tried to create commercial processes. They hoped that gaseous chlorination would enable them to: (1) treat complex sulfide ores; (2) produce elemental sulfur; and (3) use less energy.

However, there are some problems inherent in gaseous chlorination processes, e.g., (1) it is difficult to produce separate metal chloride products (2) metal chlorides fuse with the solid residue and cause plugging of the chlorination reactor, (3) sulfur chlorides form, (4) both the metal chloride and the sulfur vapors are difficult to separate and recover, (5) the reaction produces large volumes of gases which cause large losses of concentrate dust, (6) there is poor recovery and recycle of chlorine from iron species, and (7) equipment corrodes.

The second process, chlorination with salt in the absence of chlorine gas, dates back to the 19th Century, for example, see U.S. Pat. No. 589,959 issued Sep. 14, 1897 to Crooke. It also has difficulties. For example, the process uses high temperatures (900°–1000° C.) and requires more energy. Furthermore, at these temperatures the metal chlorides are volatilized and a gas scrubber system is required for their subsequent recovery.

There are some disadvantages to the use of a molten salt bath, the third process. For example: (1) it is difficult to separate a highly pure metal chloride product; (2) in a molten salt process a large amount of salt is required to maintain a fluid slurry; (3) once the ore and the salt bath are reacted, the entire melt must be dissolved to separate the metal chloride product from the solid residue; (4) it is difficult to recover and recycle the chlorides that form the bath; and (5) it is uneconomical to recover chlorine from $FeCl_3$ that has been dissolved in aqueous solutions. This last difficulty is important because complex ores contain large quantities of iron minerals which consume large amounts of chlorine. Chlorine consumption is economically disfavored.

SUMMARY OF THE INVENTION

According to the present invention, a process is provided for extracting precious and base metals from ores or their concentrates. The process comprises contacting a metals containing ore or ore concentrate with solid salt to obtain an ore/salt mixture of solids; contacting the mixture of solids with a chlorine-containing gas at a temperature between 300° and 650° C.; and recovering the metals. Preferably, the mixture of solids is maintained in substantially solid form. Preferably, enough solids are present to limit any melt to less than 10% of the ore/salt mixture, more preferably less than 8%, most preferably less than 5%. Also, it is preferable to contact the ore salt mixture that has been chlorinated with oxygen at a temperature of between 300° C. and 650° C. to oxidize iron chloride to iron oxide.

It is also preferable that the metals containing ore is contacted with the solid salt in the presence of a promoter. The promoter is present in the ore and it assists in chlorinating the precious metals and other difficult to chlorinate metal sulfides. The promoter is preferably iron or copper. Furthermore, the solid salt preferably comprises at least one inorganic chloride, such as sodium or potassium chloride. The molar ratio of formed metal chlorides to the solid salt is preferably less than 4, more preferably less than 2, most preferably less than 1.

Among other factors, the present invention is based on our finding that surprisingly high metal recoveries from a bulk ore concentrate are achieved in our process involving treatment of a solid mixture of salt and ore concentrate with chlorine gas at a temperature between 300° and 650° C. This high recovery is achieved without adding a relatively large amount of salt and without heating to relatively high temperature. The process also evolves sulfur, and forms precious and base metal chlorides from bulk concentrates in which the metals are disposed in refractory and/or complex sulfide ores. Furthermore, because the process uses relatively low temperatures and solid salt, there is essentially no loss of normally volatile metal chlorides, such as iron and copper chlorides, lead chlorides, gold chlorides, etc. They are retained within the reactor. Similarly, we have found that concentrate particles adhere to the salt particles which minimizes the loss of the concentrate. Additionally, the process is advantageous because the ore/salt mixture is easy to handle. In this form the ore/salt mixture does not plug the chlorination reactor.

Other advantages of the preferred invention include: high extraction and separation of metals from sulfide ores; high conversion in the oxidation of iron chloride to iron oxide; recycle of chlorine gas and solid salt; the ability to economically process ores or bulk concentrates that contain large amounts of iron sulfides; and environmentally safe sulfur disposition.

Once the precious or base metal chlorides have been formed by the process disclosed above, they may be recovered in subsequent processing steps. If precious metals comprise the most valuable part of the ore, then the ore is treated to selectively recover the precious metals However, if base metals are more valuable, then different processing steps are used to selectively recover the base metals.

A preferred precious metal recovery process comprises: (a) contacting a precious metal-containing ore or ore concentrate having metal sulfides, elemental metals, and iron or copper, with a solid particulate, alkali or alkaline earth metal chloride salt to form an ore/salt mixture of solids wherein the molar ratio of metal chlorides that are formed and solid salt is less than 4; (b) contacting the ore/salt mixture with chlorine gas at a temperature between 300° and 650° C. wherein the ore/salt mixture contains melted metal chlorides that comprise less than 10% of the ore/salt mixture; (c) evolving sulfur; (d) ceasing the contact of the chlorine gas with the ore/salt mixture from step (b) after substantially all of the metals have formed chlorides; (e) brine leaching the ore/salt mixture; (f) separating precious and base metal chlorides from the brine; and (g) recovering precious metals.

A preferred base metal recovery process comprises: (a) contacting base metal containing ore or ore concentrate having iron or copper with a solid particulate, alkali or alkaline earth metal chloride salt to form an ore/salt mixture of solids wherein the molar ratio of metal chlorides that are formed to solid salt is less than 4; (b) contacting the ore/salt mixture of solids with chlorine gas at a temperature between 300° and 650° C. wherein the ore/salt mixture contains melted metal chlorides that comprise less than 10% of the ore/salt mixture; (c) evolving sulfur; (d) ceasing the contact of chlorine gas with the ore/salt mixture from step (b) after substantially all of the metals have formed chlorides; (e) contacting the ore/salt mixture with an oxygen-containing gas at a temperature between 300° and 650° C.; (f) alcohol leaching the ore/salt mixture to form an alcohol solution and solids; (g) separating the alcohol solution from the solids; (h) separating leached metals from the alcohol solution; (i) brine leaching the solids at a temperature between 60° and 103° C.; and (j) separating leached metals from the brine.

DETAILED DESCRIPTION OF THE INVENTION

The process of the present invention preferably begins by intimately mixing finely ground ore with solid salt to form an ore/salt mixture in step 1. Then, the ore/salt mixture is chlorinated in step 2 to form a chlorinated ore/salt mixture. The chlorination reaction evolves elemental sulfur which is trapped in a condenser in step 4.

The chlorinated ore/salt mixture can be oxidized in step 6 to recover chlorine. In this step iron chloride is oxidized to iron oxide and chlorine gas is evolved. The evolved chlorine gas is recycled to chlorination step 2 after it is separated from the oxygen-containing gas in step 8. After oxidation step 6, the chlorinated ore/salt mixture is preferably cooled to ambient temperature and passed to either the precious or base metal recovery processes shown in FIGS. 2 and 3.

Figure 2:
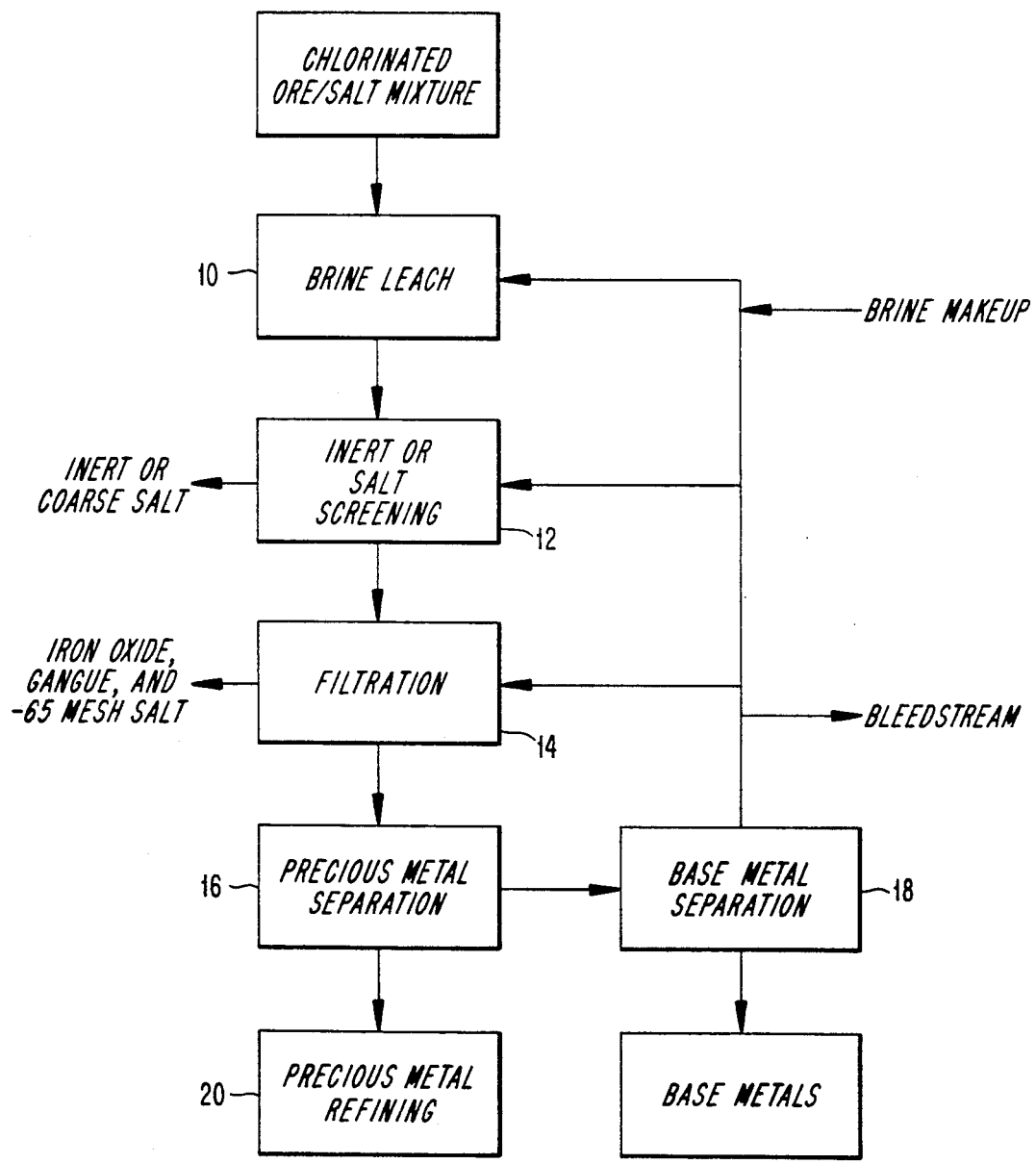
FIG. 2 provides a brief overview of Precious Metal Recovery.

As stated above, the characteristics of different ores may make it desirable to selectively recover different metals. If it is desirable to recover precious metals, then the process outlined in FIG. 2 is preferred. A description of FIG. 2 is as follows.

Figure 1:
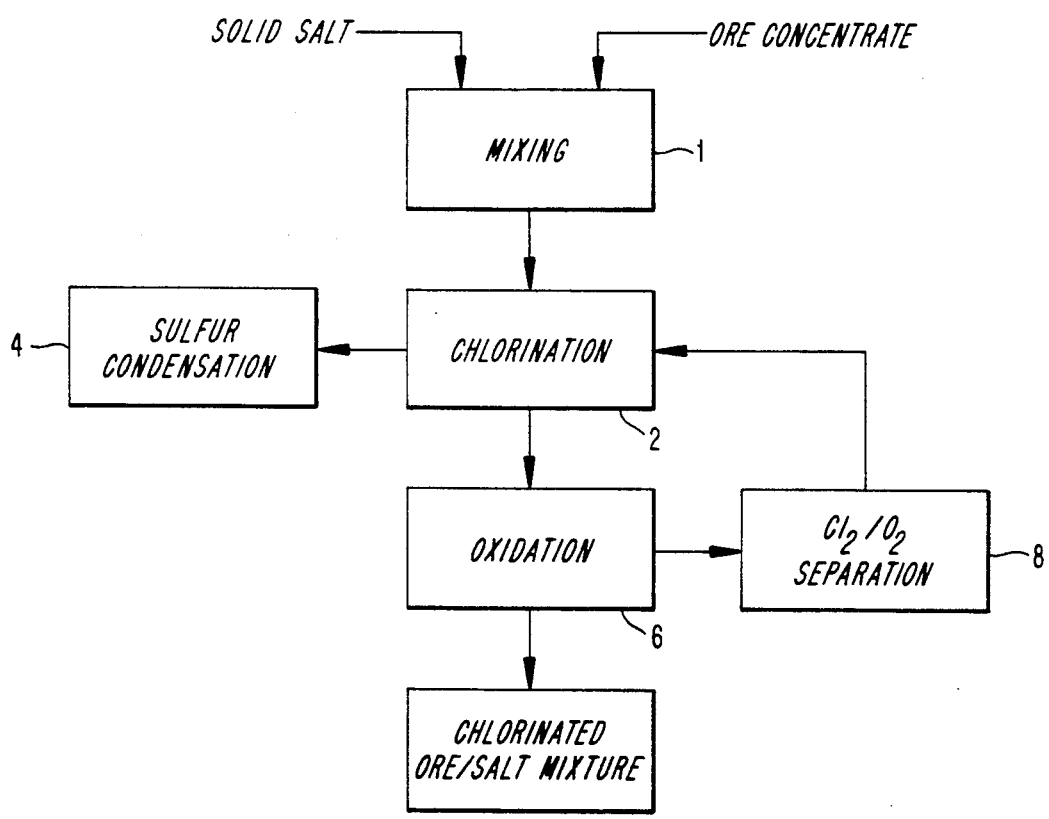
FIG. 1 provides a brief overview of the process as it relates to the chlorination of ore and/or concentrates.

The chlorinated ore/salt mixture (from the process of FIG. 1) is brine leached in step 10. Then, solid salt larger than 65 mesh is separated and brine-washed in a salt screening step 12. The solid salt is preferably dried and recycled to step 2 above. Subsequently, the sub-65 mesh material is separated from the brine and brine-washed in filtration step 14. The sub-65 mesh material consists of gangue, iron oxides that were formed in the oxidation step 6, and broken salt. The broken salt is preferably dissolved, recrystallized, and recycled to step 1.

The soluble precious metal chlorides are in the brine filtrate from the filtration step 14. They are separated from the brine, which can contain base metal chlorides, in step 16. After separation, the precious metals are recovered in a precious metals refining step 20.

The base metal chlorides are preferably recovered in a base metal separation step 18 and at least part of the brine is preferably recycled to step 10. A bleedstream is taken from the recycled brine to remove accumulated material and a brine makeup compensates for the volume loss.

Figure 3:
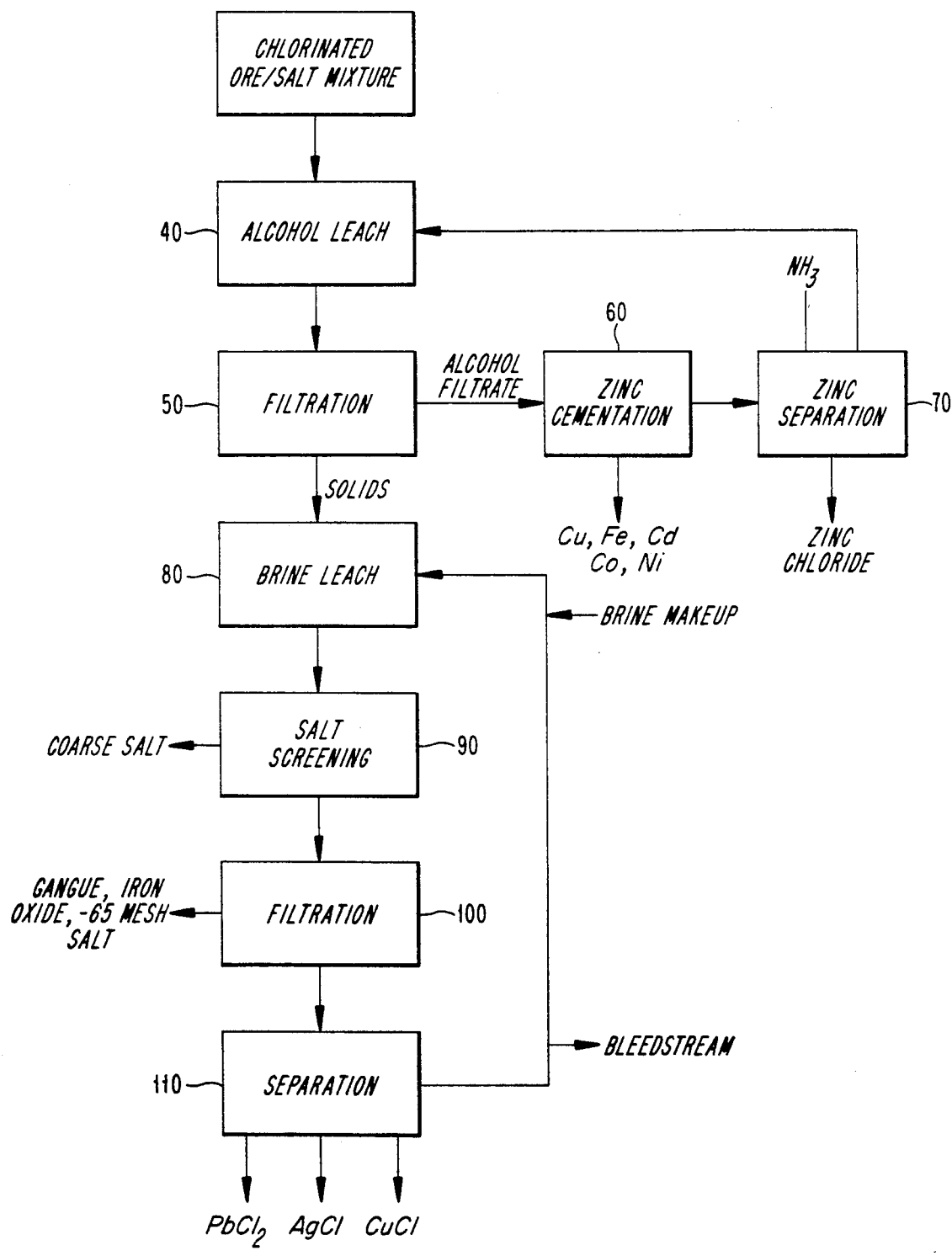
FIG. 3 provides a brief overview of Base Metal Recovery.

If it is desirable to recover base metals from the chlorinated ore/salt mixture, then we prefer the process of FIG. 3. It is as follows.

The chlorinated ore/salt mixture is alcohol leached in step 40, and the solids are separated out in a first filtration step 50. The alcohol filtrate of step 50 is preferably passed to a zinc cementation step 60 where metals such as copper, iron, cadmium, nickel, and cobalt are removed as cemented solids. Then zinc chloride is preferably precipitated with ammonia in a zinc separation step 70 and the alcohol is recycled to the alcohol leach step 40.

The solids of step 50 are hot brine leached in step 80, and the +65 mesh salt is screened in step 90. Thereafter, the gangue, iron oxide, and −65 mesh salt are filtered in step 100. The −65 mesh salt is preferably dissolved, recrystallized and recycled to step 1. In step 110 lead, silver and copper are preferably removed as chlorides.

The process of the present invention converts precious or base metals, in an ore, to chlorides. As chlorides, they can be recovered in subsequent processing steps. These precious or base metals are found in complex sulfide ores, refractory gold ores, and ore concentrates. These metals are preferably sulfides, but may be in the elemental form within the sulfide ore.

In this application, precious metals are defined as: platinum; palladium; gold; rhodium; iridium; ruthenium; silver; and osmium. Platinum group metals (PGMs) are defined as: platinum, palladium, rhodium, iridium, ruthenium, and osmium. Base metals are defined as: zinc; copper; lead; tin; nickel; iron; cobalt; bismuth; cadmium; antimony; vanadium; molybdenum; and manganese.

The types of ores and ore concentrates that can be treated by the process of the present invention are those in which precious metals, platinum group metals, and base metals are found in sulfidic, oxidic, ferritic, or silicaceous states. They can be mixed with, inter alia, iron sulfides, oxides, or silicates and ores containing compounds of these metals with iron. Minerals which can be treated in accordance with the process of the present invention include pentlandite, pyrrhotite, chalcopyrite, bornite, chalcocite, covellite, cubanite, pyrite, arsenopyrite, sphalerite, galena, millerite, niccolite, stannite, argentite, alabandite, molybdenite, stibnite, pyrargyrite, energite, calaverite, etc.

In the present process the ore or a bulk sulfide concentrate made from the ore is mixed in an intimate admixture with solid salt to form a flowable powder which is then contacted with chlorine gas. However, in some embodiments it may be preferable to form the ore and the salt together into small pellets for subsequent chlorination.

For purposes of this invention, the word "salt" encompasses the solid form of alkali or alkaline earth metal chlorides or mixtures thereof. In this application salt is defined as a particulate solid having particles which are preferably between 35 and 200 mesh, more preferably larger than 65 mesh (200 microns). Preferred examples of these alkali or alkaline earth metal chlorides are: sodium chloride, potassium chloride, barium chloride, lithium chloride, calcium chloride, and magnesium chloride, more preferred salts are sodium and potassium chloride. However, sodium chloride is most preferred because we have found it to be highly effective as well as economical.

In industrial processes, a concentrate is typically preferred over a raw ore (although a raw ore could be used). So, the raw ore is ground to less than 100 mesh and a bulk concentrate is formed by conventional ore dressing, for example, flotation. In step 1, this finely ground ore or an ore concentrate containing the metal sulfides and elemental metals is combined in an intimate admixture with the solid salt to form an ore/salt mixture. This ore concentrate typically includes a promoter which is required in this process. Preferable examples of promoters are: iron, copper, and zinc. More preferable promoters are iron or copper.

In forming the ore/salt mixture it is important to add the correct amount of salt to the ore or concentrate. The amount of solid salt is determined by the objective of achieving high metal recovery in the chlorination step and by the objective of lowering the vapor pressures of the metal chlorides that are formed during the chlorination. It is preferable to add enough salt so that the molar ratio of the formed metal chlorides and the salt is less than 4, more preferably less than 2, most preferably less than 1. The metal chlorides that are formed include, but are not limited to: $ZnCl_2$, $PtCl_2$, $PtCl_4$, $PdCl_2$, $AuCl$, $AuCl_3$, $CuCl$, $CuCl_2$, $FeCl_2$, $FeCl_3$, $PbCl_2$, $NiCl_2$, $MgCl_2$, $CoCl_2$, $MnCl_2$, $AgCl$, $RhCl_2$, $CdCl_2$, and $IrCl_2$.

Another variable is the ratio of the melt that is produced during the chlorination to the solids in the ore/salt mixture. If it is important to maintain the ore/salt mixture in a flowable form, then the amount of melt is preferably limited. Preferably, the amount of melt is less than 10% of the ore/salt mixture, more preferably less than 8%, most preferably less than 5%. If the amount of solids in the ore/salt mixture are insufficient to balance the melt, then excess salt, inert solids, or mixtures thereof, are preferably added. Preferably, the inert solids are silica, alumina, sand, or mixtures thereof. If only salt is used then the weight ratio of ore or ore concentrate to salt is preferably less than 1/5, more preferably less than 1/10. Preferably, the inert materials have a particle size between 20 and 100 mesh, more preferably approximately 65 mesh. However, even though inert solids can be added to decrease the percent melt, the remainder of this application will discuss the process as having excess salt. The inert materials can be treated in similar processing steps.

An additional constraint will be put on the ore to solid salt ratio determination if iron is present in the mixture and it is desirable to oxidize iron chloride to iron oxide. For the oxidation step to achieve high conversion, the molar ratio of solid salt to iron chloride is considered. Preferably the solid salt is present in a solid salt:iron chloride molar ratio of between 1:0.002 and 1:1, more preferably between 1:0.01 and 1:0.5. The salt catalyzes the oxidation of iron chloride to iron oxide.

Once the ore/salt mixture is formed, it is heated and preferably contacted with a chlorine-containing gas (in the absence of $O_2$) in step 2. The amount of chlorine gas should be at least stoichiometrically equal to the sulfidic sulfur in the ore concentrate. The chlorine containing gas may be 100% chlorine gas or chlorine gas mixed with a diluent. Chlorine-containing compounds (such as carbon tetrachloride, sulfur monochloride, hydrogen chloride, etc.) can work in lieu of the chlorine containing gas, but are not preferred.

During step 2, the temperature is preferably between 300° C. (572° F.) and 650° C. (1022° F.), more preferably between 350° C. and 460° C., and most preferably between 420° C. and 460° C. depending on the ore/salt mixture. The preferable lower limit is set at a temperature in which metal chlorides form, but at which sulfur monochloride formation is minimized. The upper limit is set below the temperature in which the total ore/salt mixture will melt.

If the percent melt has been limited, then it is easy to process the chlorinated ore/salt mixture because it does not form a nonflowable paste and does not plug the processing equipment. Furthermore, when cooled to ambient temperature, the chlorinated ore/salt mixture forms a flowable powder which is easy to handle.

In Step 2 the metal sulfides are chlorinated; in doing so elemental sulfur is evolved and can be condensed in step 4. Recovery of sulfur as elemental sulfur is particularly advantageous over sulfur dioxide gas which is produced by current smelting technologies, because elemental sulfur can be easily stored and shipped. Also, it does not pose an air pollution problem. A further advantage of the process is that some hazardous metals which evolve with the sulfur (as chlorides) and are removed from the ore/salt mixture so that they do not contaminate the product. The hazardous metals are not vented to the air, they are typically removed with the sulfur or are scrubbed out. These hazardous metals can be: arsenic, tellurium, antimony, selenium, and bismuth.

Some chlorine will mix with the evolved sulfur so that the two gases must be separated. They can be separated using a chlorine scrubber that has an appropriate scrubbing material. An example of a chlorine scrubbing material is an aqueous hydroxide solution (such as alkali or alkaline earth metal hydroxides). Another scrubbing material could even be the feed sulfide ore itself. By contacting the sulfide ore with the gas having sulfur and chlorine at 350° –450°, the gaseous chlorine should be consumed. Preferably, this partially chlorinated ore is fed into the present process by mixing it with salt, etc. After chlorine removal, the gaseous sulfur is preferably passed to a sulfur condenser and collected for subsequent disposal.

After step 2 the chlorinated ore/salt mixture can be oxidized in step 6 if there is much iron in the ore/salt mixture. The chlorinated ore/salt mixture is oxidized because the iron will consume chlorine gas during the initial chlorination. This is expensive. So, it may be economically desirable to free the chlorine from the iron chloride by oxidizing the iron chloride to iron oxide. In step 6 an oxygen-containing gas preferably having between 20 and 100% oxygen, more preferably between 50 and 100% oxygen is contacted with the ore/salt mixture. The temperature is preferably between 300° and 650° C., more preferably between 350° and 460° C. This oxidation is additionally advantageous because iron oxides can be subsequently separated from the soluble metal chlorides as a filterable solid.

The oxidation step 6 is preferably separated from the chlorination step 2 because the simultaneous use of chlorine and oxygen gases in the presence of sulfur can cause sulfur dioxide formation. However, oxidation does not necessarily need to take place in a different reactor from the one used for chlorination, the two reactions should be carried out separately.

During iron chloride oxidation, chlorine gas is evolved and is preferably recycled to step 2. However, before the chlorine gas can be recycled, it must be separated from oxygen in step 8. There are conventional methods that may be used, but liquefaction is provided as an example. Liquefaction separates chlorine and oxygen gases by exploiting the differences in their boiling points. Separation may be achieved by regulating the temperature and pressure of the combined gas.

By the steps outlined above, the process of the present invention forms a chlorinated ore/salt mixture. This mixture is subsequently treated by one of the metal recovery flow schemes described below.

Precious Metals Recovery

If precious metals comprise the more valuable part of the ore, then the following recovery process is preferred.

After oxidation (if the ore/salt mixture is oxidized), the chlorinated ore/salt mixture is preferably cooled to ambient temperature. Then, the solid salt, the precious metals, the base metals, and the insoluble solids are separated. This can be accomplished in many ways, but a preferred method is described below and is also depicted in FIG. 2. This preferred recovery process can also apply to chlorinated mixtures that have been generated by processes other than the present invention.

The chlorinated ore/salt mixture is brine leached in step 10 to separate the solid salt and the metal chlorides. In step 10 brine is added to the chlorinated ore/salt mixture to form a slurry preferably comprising between 10 and 60% solids, or more preferably 20 and 40% solids. Preferably, the slurry is constantly stirred for a time between 30 minutes and 4 hours.

It is believed that the brine dissolves the outer layer of the solid salt which contains the precious and base metal chlorides, and washes off iron oxide, and gangue while leaving the majority of the salt undissolved. Preferably, the brine will not dissolve the entire amount of the salt. Typical metal recoveries in this step when using saturated brine are approximately 80 to 90% for base metal chlorides, and 90 to 95% for precious metal chlorides. However, the best washing results are achieved with brine solutions that will dissolve 10 to 20% of the solid salt. Typical recoveries using 90% saturated brine are approximately 96 to 99% for base metals and 95 to 99% for precious metal chlorides.

The brine used in step 10, along with all the other brine used in this process, is at or near its saturation point It preferably contains approximately 200–350 g/l NaCl and preferably gaseous chlorine is added to between 10–100 ppm of dissolved chlorine. The additional chlorine is helpful in keeping the precious metals in solution. The pH of the brine is preferably controlled with HCl to between 1 and 2 to avoid hydrolysis of the metal chlorides.

The slurry, preferably having between 20 and 40% solids, is passed to a salt screening step 12. In step 12 solid salt is screened to separate it from the brine and −65 mesh solids. The solid salt is brine washed to ensure that the soluble metal chlorides, gangue, and iron oxides are effectively separated and passed on to the next step. The +65 mesh solid salt is preferably recycled to step 1. 65-mesh is used as an approximate solid salt screen size. Another size may be more appropriate if a larger amount of solid salt is dissolved by brine in the effort to solubilize the metal chlorides.

In filtration step 14 material preferably larger than 1 micron (i.e., salt, iron oxide, or gangue) is filtered from the brine and removed by conventional methods known to those skilled in the art. Iron oxide particles are usually bigger than 1 micron, and typically around 8–10 microns The fine gangue is typically around 50 to 70 microns. Solid salt that passes through step 12, but not step 14, may be dissolved to separate it from the gangue and iron oxide. The dissolved salt is preferably recrystallized and recycled back to step 1.

The brine filtrate, from the filtration step 14, contains the soluble precious and base metal chlorides and is passed to the precious metal separation step 16.

An ion-exchange resin can be used to separate precious metal chlorides from the brine filtrate. One specific resin is a thiourea ion-exchange resin, which is commercially available and sold under the name PAZ from SELA Inc., New York, N.Y. In this method the brine filtrate is passed through the ion-exchange resin which retains the precious metals and gold. The brine effluent contains the base metal chlorides which are subsequently separated in a base metal separation step 18.

In step 18 base metals (for example, copper, zinc, lead, and nickel, etc.) and silver are preferably separated from the brine by precipitation with sulfide ions. Preferably, sulfide ions are obtained from compounds such as hydrogen sulfide, sodium bisulfide, or more preferably sodium sulfide. The preferred amount of sulfide ions is at least stoichiometrically equal to the amount of base metals in solution. For an example of metals removal by adding sulfide ions, see U.S. Ser. No. 915,308 which is hereby incorporated by reference in its entirety.

The remaining brine solution may be recirculated to any one of the previous steps where brine is needed, such as the brine leach step 10, the salt screening step 12, or the filtration step 14.

The precious metal chlorides must be eluted from the resin. A solution of 8% thiourea in 1% HCl may be used to strip the precious metals from the PAZ ion-exchange resin. The strip solutions contain all of the precious metals as thiourea complexes and the solutions preferably have extremely low levels of base metal contamination. However, before the precious metals can be refined the thiourea must be destroyed. This is accomplished by preferably heating the solution to at least 70° C. and adding an oxidant, such as hydrogen peroxide or chlorine, to oxidize the thiourea to urea and sulfate or to carbon dioxide, nitrogen, and sulfate.

The precious metals are refined in step 20 after they are eluted from the ion-exchange resin and the thiourea is oxidized. There are several common processes for this purpose, but one in particular is shown in J. Barnes et al, "Solvent Extraction at Inco's Acton Precious Metal Refinery," Chemistry and Industry Vol. 6 (Mar. 1982) page 151, which is hereby incorporated by reference in its entirety.

Cementation can also be used to separate the precious metal chlorides from the brine. For example, elemental copper exchanges with the precious metals chlorides to form cuprous chloride and elemental precious metals which deposit on the surface of the copper powder. In this method, the brine solution is mixed with copper powder and is continually stirred. The copper powder preferably has an approximate particle size between 60 and 150 mesh (200 to 75 microns). The ratio of copper to precious metals is preferably from 1:1 to 10:1. The temperature is preferably between about 20° C. and 103° C. For high recovery of the precious metals the stirring preferably takes at least one hour or more preferably at least 3 hours, or most preferably at least 6 hours. This preferably reduces the concentration of soluble precious metals to below 1 ppm. Thereafter, the precious metals can be separated from the copper by conventional refining processes.

Other methods that may recover the precious metals from the brine solution are electrolysis or precipitation.

Base Metal Recovery

If base metals comprise the more valuable part of the ore, then the following recovery process is preferred.

After oxidation (if the ore/salt mixture is oxidized), the chlorinated ore/salt mixture is cooled preferably to ambient temperature. Then, the solid salt, the precious metals, the base metals, and the insoluble solids are separated. This may be accomplished in many ways, but a preferred method is described below and is also depicted in FIG. 3. This preferred recovery process can also apply to chlorinated mixtures that have been generated by processes other than the present invention.

The chlorinated ore/salt mixture is alcohol leached in step 40. Step 40 is designed to separate lead, silver chloride (if present), and salt from other metal chlorides. Alcohol is added to the chlorinated ore/salt mixture to form a slurry preferably comprising between 40 and 70% solids, more preferably between 50 and 60% solids. Preferably the slurry is stirred for a time between 30 minutes and 2 hours.

Preferably, the alcohols are low boiling, water-soluble, and have a high solubility for the metal chlorides. Preferred example alcohols are: water-soluble, straight-chain and branched alcohols; glycol; diols; and triols; more preferably, methanol; ethanol; and propanol. Preferably, the alcohol is not diluted.

After the alcohol leach step 40, the alcohol is separated from the solids in step 50. The filtration may be accomplished by any conventional means, however, a preferred means is by pressure filtration. Preferably the solids are separated from the alcohol filtrate, which contains soluble metal chlorides of zinc, copper, iron, cadmium, cobalt, nickel, and any precious metals that are present, among other metals. If necessary, another filtration step may be employed to ensure that the alcohol filtrate does not contain solids. The filtration step 50 forms an alcohol filtrate and solids.

Then, the soluble metal chlorides are separated from the alcohol. It is preferred that soluble chlorides of copper, cadmium, nickel, cobalt, and iron are separated by cementation with at least a stoichiometric amount of elemental zinc powder in step 60. Precious metals will also cement out in this step if they are present in the ore. Here, elemental zinc replaces the base metal to form zinc chloride and elemental base metals. Preferably, the ratio of zinc powder to base metals is between 1:1 and 10:1. The temperature is preferably between 20° C. and 103° C. The zinc particle size is preferably between 60 and 150 mesh. Preferably, dry HCl gas is added to the alcohol to improve the cementation. After cementation, a substantially pure zinc chloride alcohol filtrate remains.

The zinc chloride can be precipitated by contacting the zinc chloride alcohol filtrate with dry ammonia gas in step 70 to form a substantially pure zinc diammine chloride precipitate. This zinc diammine chloride precipitate may be removed by any conventional means, but it is preferable to use pressure filtration. Thereafter, the alcohol is preferably recycled back to the alcohol leach step 40. A high purity (>99%) zinc product is achieved when the zinc powder cementation and the ammonia precipitation steps are used.

If it is not necessary to achieve a high purity zinc product, then the metal chlorides (including zinc chloride) can be removed from the alcohol solution by merely using the ammonia sparge alone. The precipitates will be in the form of metal chloride amine complexes.

The solids from the filtration step 50 are preferably hot brine leached in step 80. It is important that the temperature of the brine leaching step is between 60° and 103° C., more preferably between 85° and 103° C. The elevated temperature is important in solubilizing lead chloride. Enough brine is added to form a slurry having between 40 and 70% solids. The brine concentration is preferably the same as described in step 10 of the precious metal recovery process described above. It is intended that this brine leach step 80 solubilizes other metal chlorides that were not leached in the alcohol leach step 40, most notably lead, silver, and cuprous chloride Preferably the slurry is mixed for a time sufficient to solubilize these chlorides.

After the brine leach step 80, +65 mesh salt is screened from the slurry in step 90 and preferably recycled to step 1. (The brine solution must be maintained at an elevated temperature during this step). Thereafter, iron oxide, −65 mesh salt, gangue, and possibly gold are filtered from the brine in step 100. Conventional means, such as pressure filtration, can be used. The −65 mesh salt is preferably dissolved, recrystallized, and recycled back to step 1. After filtration, lead, silver, and cuprous copper are separated from the brine.

Silver and cuprous copper are preferably separated by contacting the brine filtrate with lead powder. They will be removed as a cement and some lead will solubilize as a chloride. Thereafter, lead is preferably separated by reducing the temperature of the brine filtrate to less than 30° C. The crystallized lead chloride can be removed by conventional separation techniques.

The brine is preferably recycled back to brine leach step 80. Preferably, a bleedstream removes soluble metal chlorides that have accumulated in the brine solution. Examples of these soluble metal chlorides are: calcium and magnesium chlorides. Preferably a brine makeup compensates for the volume that was lost to the bleedstream.

The entire process for extracting metals from ore can be operated either in a batch mode or in a continuous mode. In either case, the process can use a ribbon blender or a screw-type reactor just to name a few examples.

Without being necessarily bound by theory, it is thought that the following mechanisms are responsible for metals recovery.

When the ore concentrate is combined in an intimate admixture with the solid salt, it generally adheres to the solid salt to form a ore/salt mixture. Thereafter, when the ore/salt mixture is heated and contacted with chlorine gas, gaseous chlorination takes place according to the following equation:

$$MS + Cl_2 \rightarrow MCl_2 + S$$

where M is a metal, S is sulfur, and $Cl_2$ is chlorine gas. It is believed that the base metal chlorides that form during the gaseous chlorination react with the salt and an incipient liquid film is formed at a temperature well below the melting point of the solid salt. The incipient liquid film forms around the solid salt if salt is used as an inert material. If some other material is used, then the formed metal chlorides plus the melted salt will form an incipient liquid film around it. It is also believed that the incipient liquid film forms due to the action of certain promoters which lower the melting point of the ore/salt mixture. These promoters can be: iron, copper, and zinc when zinc is in the presence of iron or copper. It is believed that this incipient liquid film is composed of the solid salt and the formed metal chlorides.

It is also thought that the solid salt and the incipient liquid film serve to prevent certain metal chlorides (such as iron chloride and copper chloride) from vaporizing out of the mixture (as well as the finely ground concentrate). The solid salt absorbs these metal chlorides and in doing so forms the incipient liquid film.

As mentioned previously, metal sulfides are chlorinated to form metal chlorides. However, some metal sulfides chlorinate more easily than others. Examples of easy-to-chlorinate metal sulfides are: copper, nickel, iron, tin, and lead. Other metal sulfides are hard to chlorinate. Examples of hard-to-chlorinate metal sulfides are: zinc, platinum, and palladium. This is a nonexclusive list and it is not intended to limit the invention in any way. Additionally, precious metals in the elemental form are difficult to chlorinate.

The incipient liquid film, which is believed to form in the present process, maintains more chlorine (as metal chlorides) in contact with the metal sulfides. This enhances the chemical attack on the harder to chlorinate metal sulfides and the elemental precious metals which greatly increases the recovery of these metals.

The following reactions are thought to take place during the formation of an incipient liquid film:

$$2FeCl_2 + Cl_2 \rightarrow 2FeCl_3$$

or, $$2CuCl + Cl_2 \rightarrow 2CuCl_2$$

Iron and copper chlorides, formed in the incipient liquid film, can serve as chlorine carriers. They enhance the chloridation of the difficult-to-chlorinate metal sulfides which may be in the elemental or sulfide forms. In addition, chlorine gas dissolves into the incipient liquid film up to 1 gram/liter. This is important for gold, for example, because it will not form a chloride unless there is an excess of chlorine.

It is believed that the chlorination reactions that are assisted by the chlorine carriers are:

$$2FeCl_3 + MS \xrightarrow{NaCl} MCl_2 + 2FeCl_2 + S$$

or, $$2CuCl_2 + MS \xrightarrow{NaCl} MCl_2 + 2CuCl + S$$

or, $$2FeCl_3 + M \xrightarrow{NaCl} MCl_2 + 2FeCl_2$$

or, $$2CuCl_2 + M \xrightarrow{NaCl} MCl_2 + 2CuCl_2$$

wherein M is a metal as a metal sulfide or as elemental metal. Metal subsulfides, (i.e., $M_2S_3$, $M_2S$, etc.) will react in a similar manner. Examples of some subsulfides are: $Co_3S_4$ and $Mo_2S_3$.

As mentioned previously, sulfide ores have metals that are both easy and hard to form metal chlorides. The metals that are easy to form into metal chlorides are usually converted in the gaseous chlorination and are absorbed into the salt to form the incipient liquid film, whereas the metals that are hard to form into metal chlorides are usually converted in the incipient liquid film. It is believed that the incipient liquid film serves to retain the easier-to-chlorinate metals (which would otherwise vaporize) to assist in the chloridation of the harder to chlorinate metals.

The following examples are presented here as specific embodiments of the overall concept of the invention. It is intended that they be exemplary and not limiting in any way.

EXAMPLES

Example I

Chlorination of Ore Concentrate

This run demonstrates the ability of the process to break down and extract the precious and base metal sulfides.

Twenty grams of ore concentrate and 200 g of sodium chloride (NaCl) were mixed to form an ore/salt mixture. This mixture was introduced into a ½-liter glass mixer reactor. The concentrate contained 0.554 oz/t. gold, 13.7 oz/t. Pt, 50.2 oz/t. Pd, 0.45 oz/t. Rh, 3.78% Ni, 2.85% Cu, 17.7% Fe, 2.1% Zn, and 0.5% Pb. Particle size of the sodium chloride was +65 mesh (bigger than 65 mesh or 200 micron) while that of the concentrate was −150 mesh (smaller than 150 mesh or 100 micron). The ore/salt mixture was continuously stirred in the mixer reactor under nitrogen. The temperature of the reactor was brought up to 450° C. and chlorine gas was introduced at a rate of 200 cc/min. for 1 hr. Sulfur was evolved from the reactor and was collected in a condenser. During the chlorination, the ore/salt mixture remained as a flowable powder without forming a sticky nonflowable paste. After the chlorination, the reactor was flushed with nitrogen and the mixture was cooled down to room temperature. The ore/salt mixture was introduced into a leaching vessel as a flowable powder where the solid salt was dissolved with 898 cc of distilled water containing 10 ppm dissolved chlorine and at pH 1.8.

The solid residue was filtered out of the solution and each was analyzed for precious and base metal content. The following table shows the percent extraction into solution for each metal.

| Metals | % Extraction |
|--------|--------------|
| Pt | 98.9 |
| Pd | 99.6 |
| Au | 95.3 |
| Rh | 99.9 |
| Cu | 98.5 |
| Ni | 94.3 |
| Zn | 100.0 |
| Pb | 100.0 |
| Fe | 76.3 |

This process achieved very high extractions for both the precious and the base metals. Although it is not certain, the lower extractions for iron are believed to be due to the presence of iron oxides in the concentrate. Iron oxides do not chlorinate and are retained with the solid residue.

Example II

Chlorination of Ore Concentrate in the Pressure Of Inert Material

This run demonstrates the use of inert material in the present process.

Twenty grams of ore concentrate, 10 g of potassium chloride, (KCl) and silica sand were mixed to form an ore/salt/silica mixture. This mixture was introduced into a ½-liter glass mixer reactor. The concentrate contained 0.554 oz/t. gold, 17.3 oz/t. Pt, 50.2 oz/t. Pd, 0.45 oz/t. Rh, 3.78% Ni, 2.85% Cu, 17.7% Fe, 2.1% Zn, and 0.5% Pb. Particle size of the silica sand was +65 mesh (bigger than 65 mesh or 200 micron) while that of the concentrate was −150 mesh (smaller than 150 mesh or 100 micron). The mixture was continuously stirred in the mixer reactor under nitrogen. The temperature of the reactor was brought up to 450° C. and chlorine gas was introduced at a rate of 200 cc/min. for 1 hr. Sulfur was evolved from the reactor and was collected in a condenser. During the chlorination, the mixture remained as a flowable powder without forming a sticky nonflowable paste. After the chlorination, the reactor was flushed with nitrogen and the mixture was cooled down to room temperature. The ore/salt mixture was introduced into a leaching vessel as a flowable powder where the solid salt was dissolved with 898 cc of distilled water containing 10 ppm dissolved chlorine and at pH 1.8.

The solid residue was filtered out of the solution and each was analyzed for precious and base metal content. The following table shows the percent extraction into solution for each metal.

| Metals | % Extraction |
|--------|--------------|
| Pt | 96.6 |
| Pd | 98.6 |
| Au | 35.4 |
| Cu | 99.8 |
| Ni | 98.6 |
| Fe | 83.4 |

Similar to Example I this process achieved very high extractions for both the precious and the base metals.

Example III

Chlorination and Oxidation of Ore Concentrate

This run achieved high extraction of both the precious metals and the base metals while converting iron chloride to iron oxide for easy separation. Similar to Example I, the solids remained in a powder form without forming a melt or a nonflowable sticky paste.

Twenty grams of ore concentrate and 200 g of solid sodium chloride salt were mixed and chlorinated for 1 hr. as in Example I. After 1 hr. of chlorination at 450° C., the chlorine gas flow was stopped and oxygen gas was introduced into the reactor at a flow rate of 157 cc/min. for 1 hr. Here, iron chlorides were oxidized to iron oxide while releasing chlorine gas. The chlorine gas was absorbed into a sodium hydroxide scrubbing solution. After oxidation, the reactor was flushed with nitrogen and the mixture was stirred and cooled to room temperature. This flowable and granular mixture was leached with distilled water containing 10 ppm dissolved chlorine and at pH 1.8. The following table shows the percent extraction into solution for each metal.

| Metals | % Extraction |
| --- | --- |
| Pt | 95.5 |
| Pd | 99.1 |
| Au | 96.7 |
| Rh | 99.9 |
| Cu | 98.9 |
| Ni | 98.6 |
| Zn | 99.3 |
| Pb | 99.9 |
| Fe | 0.1 |

Example IV

Brine Leach of A Precious Metal Containing Concentrate

Twenty grams of a precious and base metal-containing concentrate from Example I were mixed with 200 grams of salt and chlorinated at 450° C. for 90 minutes. Thereafter, the mixture was cooled and leached at room temperature with 500 cc of concentrated brine for 1 hour. The brine was at pH 1 and contained about 100 ppm free chlorine. The brine was filtered from the solids and the solids were leached again in fresh brine, then filtered. The solids from this second leach were treated with acidified deionized water (pH 1) to dissolve the salt and the solids were recovered. Samples from the two brine leaching steps and the salt dissolution step were analyzed for precious and base metals.

The distribution of the elements between the two brine leaching steps, the salt particles and the tailings is given in Table 1. Total metals recoveries were: 98.2% Pt, 99.1% Pd, 90.34% Au, 99.5% Cu, 79.9% Fe, 98.9% Ni.

TABLE 1

| Brine Leaching of Chlorinated Concentrates Mixed With Salt | | | | | | |
| --- | --- | --- | --- | --- | --- | --- |
| | Metal Distribution, % | | | | | |
| Medium | Pt | Pd | Au | Cu | Fe | Ni |
| Leaching brine 1 | 96.7 | 94.4 | 72.3 | 83.0 | 85.7 | 75.4 |
| Brine leaching 2 | 3.2 | 4.4 | 18.0 | 4.8 | 5.4 | 16.6 |
| Retained in salt | | 1.2 | 9.6 | 12.0 | 8.7 | 7.9 |

Example V

Extraction of Precious Metals From Brine With a Selective Ion Exchange 1246 ml of a brine solution was obtained from the chlorination-oxidation process described in Example III. It contained 10 ppm Pt, 62 ppm Pd, 0.82 ppm Au, 830 ppm Cu, 1240 ppm Ni, 740 ppm Zn, 177 ppm Pb, and 14 ppm Fe. The pH of the solution was 2.0. The solution was ion-exchanged to extract the precious metals. The resin that was used is selective for PGM and gold. It was purchased from Sela Inc., 545 West End Avenue, New York, N.Y. 10024 and is sold under the trade name of PAZ-1. The 1246 ml of brine solution was passed over a 25 cc ion-exchange bed at a rate of 7.4 bed volumes per hr. The raffinate was analyzed for precious and base metals and it contained 0.06 ppm Pt, 0.07 ppm Pd, <0.01 ppm Au, 1070 ppm Ni, 730 ppm Cu, 620 ppm Zn, 149 ppm Pb, and 12 ppm Fe. The resin selectively removed more than 99% of the precious metals.

After loading, the resin was washed with 100 cc of a 1% HCl solution at a rate of 7.4 bed volumes per hour. Then, it was eluted with 8% of an aqueous solution of thiourea containing 20 ml/l perchloric acid and 5 ml/l HCl to produce a thiourea strip solution. Over 99% of Pt, Pd, and gold was selectively recovered from the resin.

Example VI

Oxidation of Thiourea Solutions

The thiourea solution of Example IV was converted to the chloride form for further separation and refining. This example shows palladium recovery.

500 cc of a thiourea strip solution, that contained 1% thiourea, 0.3% HCl, 1.4% $HClO_4$, and 1 g/l of palladium, were loaded into a stirred resin kettle, heated to 70° C., and reacted with chlorine gas at 500 cc/min. for 1 hour. A 20-cc sample was taken from the solution and contacted with 25% N-octyl sulfide in kerosene. After 10 min. of shaking, over 99.9% of the palladium was recovered.

Example VII

Cementation of Precious Metal on Copper Powder

A first brine solution was constructed containing the following metals as soluble metal chlorides 250 mg/l Pd; 75 mg/l Pt; and 5.35 mg/l Au. A second brine solution was constructed containing: 38.5 mg/l Pd; 9.8 mg/l Pt; and 0.54 mg/l Au. Each brine solution contained 300 g/l NaCl at pH 1.5. Twenty (20) grams of copper powder were added to 500 cc of each solution and they were stirred for 3 hours at 103° C. The concentration of soluble precious metals in the first solution decreased to: 0.21 mg/l Pd; 5 mg/l Pt; and 0.34 mg/l Au. The concentration of the soluble precious metals in the second solution decreased to: <0.02 mg/l Pd; <0.05 mg/l Pt; and <0.01 mg/l Au.

Example VIII

Reproducibility of Precious Metal Extraction at Varying Ore:Salt Weight Ratios

Ten examples were run to determine the reproducibility of the process recovery for Pt, Pd, and Au recovery. Nine samples of concentrate containing the three metals were mixed with salt at a 1:10 concentrate to salt ratio, one sample was mixed at a 1:5 concentrate to salt ratio. The samples were chlorinated from between 30 and 85 minutes. The mean metal recovery for Pt was 98.6±0.9%, Pd was 98.7±1.0%, and Au was 94.7±3.3%.

Example IX

Chlorination and Oxidation of Refractory Gold Ore

The following example demonstrates gold extraction from a refractory ore which only yielded 35-40% extraction during cyanide leaching. Twenty grams of refractory gold concentrate containing 94% pyrite and 6% siliceous gangue were mixed with 100 g of solid salt (NaCl) to form an ore/salt mixture. The gold content of the concentrate was 8.91 g/t. The particle size of the concentrate as −200 mesh (less than 200 mesh or 74 micron) while the size of the solid salt was +65 mesh (greater than 65 mesh or 200 micron). The ore/salt mixture was fed into a glass stirred reactor which was flushed with nitrogen (i.e., oxygen-free). The temperature in the reactor was increased to 450° C. and chlorine gas was fed into the reactor at a rate of 157 cc/min. for 1 hr. Thereafter, the chlorine gas flow was stopped and oxygen was fed into the reactor to oxidize the iron chlorides that formed during the chlorination stage. During both the chlorination and the oxidation stages, the ore/salt mixture was constantly stirred at 300 rpm. After the oxidation, the reactor was flushed with nitrogen and the mixture was allowed to cool. Subsequently, the cooled ore/salt mixture was leached with 439 cc of distilled water that was acidified to pH 2 with HCl and contained 10 ppm of dissolved chlorine. Analysis of the solids showed that 99.7% of the gold was extracted into the leaching solutions. Ninety-nine percent of the iron was converted to iron oxide and only 1% was extracted into the solutions as iron chloride.

Example X

Chlorination of Refractory Gold Ore in the Presence of KCl

Ten grams of a refractory gold ore was mixed with 200 g of solid KCl to form an ore/salt mixture. The refractory gold ore contained 0.24 oz/ton gold, 7.92 oz/ton silver and consisted of approximately 95% pyrites with the remainder being siliceous gangue The ore/salt mixture was chlorinated at 450° C. for 47 minutes and oxidized at 450° C. with oxygen for about four hours. After oxidation, the chlorinated ore/salt mixture was cooled and contacted with 50 g of deionized water acidified to pH 1.87. About 6% of the solid KCl dissolved. After the deionized water wash, 2387 g of saturated KCl brine was added and the resulting slurry was mixed for 30 minutes. The coarse KCl was then separated from the iron oxide and gangue and the soluble metal chlorides. Approximately 99% of the gold was recovered.

Example XI

Chlorination and Oxidation of a Base Metal Concentrate

This example shows that chlorinating a bulk sulfide concentrate in the presence of salt and thereafter oxidizing the chlorinated mixture results in high extractions for base metals. Iron oxide remains insoluble.

Ten grams of a bulk sulfide concentrate and 200 grams of sodium chloride were mixed together to form an ore/salt mixture and this mixture was introduced into a ½-liter glass mixer reactor. The concentrate contained 20% Zn, 8.8% Pb, 0.45% Cu, 12.9% Fe, 11.5% S, 17.3% $SiO_2$, 1.25% CaO, 0.95% MgO, 3.05% $Al_2O_3$, 0.05% Mno, 1.61% $K_2O$ and 93.8 ppm Ag. The ore/salt mixture heated and chlorinated for 22 minutes as described in Example I. After the chlorine gas flow was stopped, oxygen gas was introduced into the reactor at a flowrate of 157 cc/minute for 1 hour at 450° C. The evolved chlorine gas was absorbed into a sodium hydroxide scrubbing solution. After oxidation, the reactor was flushed with nitrogen and the mixture was cooled to room temperature while being stirred. The chlorinated ore/salt mixture was contacted with sufficient deionized water to dissolve the metal chlorides and salt. (The pH of the deionized water was adjusted to 1.9 with hydrochloric acid.) The recoveries of the various metals into the solution are given in the following table.

| Metals | % Extraction |
| --- | --- |
| Zn | 99.18 |
| Fe | 4.91 |
| Pb | 98.08 |
| Cu | 98.43 |

Example XII

Chlorination and Oxidation of a Bulk Sulfide Concentrate Followed by Alcohol and Brine Leaching Twenty grams of ore concentrate and 100 grams of salt were mixed and chlorinated for 40 minutes at 450° C., as in Example IX. After the chlorine gas flow was stopped, oxygen gas was introduced into the reactor at a flowrate of 157 cc/minute for 2 hours. Evolved chlorine gas was absorbed into a sodium hydroxide scrubbing solution. After oxidation, the reactor was flushed with nitrogen and the chlorinated ore/salt mixture was cooled to room temperature while stirring. It was flowable and granular. After cooling, the chlorinated ore/salt mixture was leached for 30 minutes with 291 grams of ethyl alcohol. Thereafter, the alcohol solution was filtered out and the solids were leached with 2483 grams of a saturated sodium chloride solution at pH 1.8 at room temperature for 3 hours with vigorous stirring. The stirring helps release the gangue and iron oxide from the salt. After the sodium chloride leaching, gangue, iron oxide, and salt were filtered out. These insolubles were separated from each other and the salt was recycled as in Example XI. Total metal extraction was: 72.93% Zn, 97.76% Pb, 94.01% Cu and 1.3% Fe.

The distribution of the metals between the alcohol and brine leach solutions are given in the following table.

| Metal | % Metal in Alcohol | % Metal in Brine | % Metal Retained in Salt |
| --- | --- | --- | --- |
| Zn | 94.5 | 3.5 | 1.8 |
| Pb | 0.1 | 95.5 | 4.4 |
| Cu | 34.5 | 42.1 | 23.4 |
| Fe | 2.9 | 46.1 | 51.0 |

This example also shows zinc chloride separation from the bulk of the other base metals. Removal of other metals makes the purification of zinc chloride simpler.

Example XIII

Salt Separation

In this Example, salt was recycled after separation of the fine gangue and the fine iron oxide from the coarse (approximately 65 mesh) salt.

109.8 Grams of the solid mixture (from the sodium chloride leached residue in Example X containing coarse salt, gangue and iron oxide) was introduced into a fluidized bed reactor for separation. The fluid used was a fresh brine having a pH of 1.8. In the fluidized bed reactor, the fine gangue and iron oxides were separated and elutriated out of the reactor while the leaving coarse salt behind. This operation removed 78.3% of the fine gangue and iron oxide particles and recovered 92.3% of the salt. This salt, after drying, is ready for recycle back to the chlorination step.

Example XIV

Iron Chloride Oxidation

This example shows the effects of varying amounts of salt on iron chloride oxidation.

Ore concentrate was mixed with varying amounts of salt and compressed under 2000 psi pressure into pellets ¼ inch by ½ inch. The pellets were dried and fed into a shaft chlorinator that was heated to 450° C. and were chlorinated for between 20 and 30 minutes. Thereafter, the pellets were transferred to a second shaft reactor and were contacted with oxygen at 450° C. The results are shown in Table 4.

TABLE IV

| Salt/Conc. Ratio | Iron Oxidation, % |
| --- | --- |
| 2:1 | 63.4 |
| 3:1 | 96.1 |
| 4:1 | 99.3 |
| 3:1 | 94.5 |

Example XV

Zinc Cementation from Alcohol Solutions

An ethanol solution having soluble metal chlorides was prepared having the composition shown in Table 3. Additionally, dry hydrochloric gas was dissolved into the solution at 1-4 g/Kg solvent. HCl aids the cementation reaction. One gram of zinc powder was mixed with 25 cc of the ethanol solution at 73° C. and at room temperature in the presence of dry hydrochloric acid (1-4 g/Kg solvent) for 17 minutes.

The final concentrations of metal chlorides are shown in Table 3.

TABLE 3

| Metal Chloride | Conc. in Alcohol Solutions, ppm | | |
| --- | --- | --- | --- |
| | Before Cementation | Cementation at 73° C. | Cementation at Room Temperature |
| Cu | 898.4 | 0.87 | 1.05 |
| Fe | 4,335.5 | 0.43 | 2.43 |
| Mn | 1,015.8 | 479 | 315.1 |
| Zn | 54,116.9 | 53,975 | 42,180 |
| Pb | 7,464.8 | 1.76 | 7.48 |
| Co | 929.3 | 0.48 | 2.19 |
| Ni | 929.3 | 0.06 | 2.41 |
| Ratio of Zn/ Active Impurities | 3.3:1 | 15,000:1 | 2,726:1 |

Example XVI

Precipitation of Zinc Diammine Chloride

This example shows that ammonia gas can precipitate zinc chloride from alcohol solutions and that the precipitated crystals are large enough for easy filtration. Furthermore, when zinc chloride is complexed with ammonia, it loses its hydroscopic nature. Later, that ammonia is easily recovered.

Twenty grams of anhydrous zinc chloride were dissolved in 200 cc of ethyl alcohol. Then, the solution was sparged with dry gaseous ammonia and at a flowrate of 260 cc/min at room temperature until 4.964 grams of ammonia were absorbed. The solids that formed were filtered and analyzed. They weighed 24.4 grams and consisted of $Zn(NH_3)_2 Cl_2$ (zinc diammine chloride) crystals 4-10 microns in size. The remaining alcohol solution contained 173.5 ppm of residual dissolved zinc. In contrast to anhydrous zinc chloride which is very hydroscopic, the diammine complex does not absorb moisture and is stable in "open air". Thermal gravimetric analysis and differential thermal analysis show that the zinc diammine complex melts at 200° C. and decomposes to ammonia gas and zinc chloride at 280° C.

Example XVII

Separation of Metal Chlorides in an Alcohol Solution with Ammonia

This Example shows that metal chlorides of Cu, Co, Ni, Ca, Mg, Cd and Mn can be separated from an alcohol solution using ammonia gas. 200 Grams of alcohol solutions containing 45,000 ppm Zn, 417 ppm Mn, 0.16 ppm Fe, 490 ppm Cd, 535 ppm Co, 150 ppm Ni, 2.5 ppm Mo, 1315 ppm Ca, 10.1 ppm Pb, 332 ppm Cu, 204 ppm Mg as metal chlorides were sparged with dry ammonia and 8.6 grams of ammonia was absorbed by the solution. The final solution contained —217 ppm Zn, 1.22 ppm Mn, <01 ppm Fe, 3.27 ppm Cd, <2.5 ppm Co, <1.2 ppm Ni, <0.2 ppm Mo, 6.3 ppm Ca, 1.3 ppm Cu, 2 ppm Mg.

Example XVIII

Alcohol Leach

A precious metal-containing concentrate from Example I was mixed with 100 grams of salt and this mixture was stirred and chlorinated in a resin kettle at 450° C. for 1 hour at a chlorine flowrate of 250 cc/ minute. After the chlorination, the reactor was cooled, and the chlorinated mixture was leached with 550 ml of ethanol. The solid residue from this leach was further leached with diluted hydrochloric acid (pH 1) solution to dissolve the salt and leave a solid residue consisting of gangue and iron oxides. The overall extraction of metals was: 97.5% Pt; 97.0% Pd; 94.3% Au; 99.2% Cu; 76.7% Fe; and 96.1% Ni. The distribution of the metals is shown in Table 2.

TABLE 2

| Ethanol Leaching of Produced Metal Chlorides | | | | | | |
| --- | --- | --- | --- | --- | --- | --- |
| | Metal Distribution, % | | | | | |
| Medium | Pt | Pd | Au | Cu | Fe | Ni |
| In alcohol solutions | 80.5 | 75.6 | 94.3 | 87.4 | 67.0 | 8.5 |
| Retained in salt | 17.0 | 11.4 | — | 11.8 | 9.3 | 87.6 |
| Retained in solid residue | 2.5 | 3.0 | 5.7 | 0.8 | 23.7 | 3.9 |

The embodiments of this invention which are exemplified above are intended solely as illustrations of the invention. They should not be interpreted as limiting the scope of the invention to just those features which are shown or disclosed. As those familiar with this area of research will appreciate, there are numerous variations of the invention as defined in the following claims which may have not been exemplified but which will achieve equivalent results.

What is claimed is:

1. A process for extracting precious and base metals from ore or ore concentrate, comprising:
   (a) contacting a metals-containing ore with solid salt to obtain an ore/salt mixture of solids;
   (b) chlorinating the mixture of solids by contacting the mixture with a chlorine-containing gas at a temperature between 300° and 650° C.; and
   (c) recovering the metals.

2. A process as recited in claim 1 wherein the ore/salt mixture is maintained in substantially solid form.

3. A process as recited in claim 2 wherein the ore/salt mixture contains less than 10% melt.

4. A process as recited in claim 2 wherein the ore/salt mixture contains less than 8% melt.

5. A process as recited in claim 2 wherein the ore/salt mixture contains less than 5% melt.

6. A process as recited in claim 2 wherein the metals containing ore is contacted with the solid salt in the presence of a promoter.

7. A process as recited in claim 6 wherein the promoter is selected from the group consisting of iron or copper.

8. A process as recited in claim 1 wherein the molar ratio of formed metal chlorides to solid salt is less than 4.

9. A process as recited in claim 8 wherein the molar ratio of formed metal chlorides to solid salt is less than 2.

10. A process as recited in claim 9 wherein the molar ratio of formed metal chlorides to solid salt is less than 1.

11. A process as recited in claim 1 wherein the solid salt comprises at least one alkali or alkaline earth metal chloride.

12. A process as recited in claim 11 wherein the solid salt is selected from the group consisting of sodium chloride or potassium chloride.

13. A process as recited in claim 12 wherein the solid salt is sodium chloride.

14. A process as recited in claim 11 further comprising contacting the ore/salt mixture that has been chlorinated with an oxygen-containing gas at a temperature between 300° C. and 650° C.

15. A process as recited in claim 14 wherein the temperatures are between 350° C. and 460° C.

16. A process as recited in claim 1 wherein the temperature of step (b) is between 350° and 460° C.

17. A process as recited in claim 1 further comprising evolving sulfur.

18. A process as recited in claim 17 further comprising evolving metals selected from the group consisting of arsenic, bismuth, antimony, tellurium, or selenium with the sulfur.

19. A process as recited in claim 18 further comprising separating sulfur and chlorine gas.

20. A process as recited in claim 11 wherein the ore/salt mixture comprises precious metals which are selected from the group consisting of: platinum, palladium, gold, rhodium, iridium, ruthenium, silver, or osmium.

21. A process as recited in claim 20 wherein the precious metals are selected from the group consisting of: platinum, palladium, or gold.

22. A process as recited in claim 21 further comprising separating the precious metals from the ore/salt mixture.

23. A process as recited in claim 22 wherein the precious metals are separated from the ore/salt mixture by brine leaching.

24. A process as recited in claim 23 wherein the solid salt is selected from the group of potassium chloride or sodium chloride and the molar ratio of formed metal chlorides to solid salt is less than 4.

25. A process as recited in claim 24 wherein the molar ratio of formed metal chlorides to solid salt is less than 2.

26. A process as recited in claim 25 wherein the molar ratio of formed metal chlorides to solid salt is less than 1.

27. A process as recited in claim 23 further comprising separating the solid salt from the brine and recycling the solid salt.

28. A process for recovering precious metals from ore or ore concentrates having metal sulfides and elemental metals comprising:
(a) contacting a precious metal-containing ore or ore concentrate having metal sulfides, elemental metals, and iron or copper, with a solid particulate, alkali or alkaline earth metal chloride salt to form an ore/salt mixture of solids wherein the molar ratio of formed metal chlorides to solid salt is less than 4;
(b) chlorinating the ore/salt mixture by contacting the ore/salt mixture with chlorine gas at a temperature between 300 and 650° C. wherein the ore/salt mixture contains melted metal chlorides that comprise less than 10% of the ore/salt mixtures;
(c) evolving sulfur;
(d) ceasing the contact of the chlorine gas with the ore/salt mixture from step (b) after substantially all of the metals have formed chlorides;
(e) brine leaching the ore/salt mixture;
(f) separating precious and base metal chlorides from the brine; and
(g) recovering the precious metals.

29. A process as recited in claim 28 wherein the chlorinated mixture of step (b) is heated to between 350° C. and 460° C.

30. A process as recited in claim 28 further comprising: separating the solid salt from the brine and recycling the solid salt; and recovering base metals.

31. A process as recited in claim 28 wherein the solid particulate, alkali or alkaline earth metal chloride salt is selected from the group consisting of sodium chloride or potassium chloride.

32. A process as recited in claim 28 further comprising contacting the ore/salt mixture that has been chlorinated in step (b) with an oxygen-containing gas at a temperature between 300° C. and 650° C.

33. A process as recited in claim 28 wherein the ratio of formed metal chlorides to solid salt is less than 2.

34. A process as recited in claim 28 wherein the ratio of formed metal chlorides to solid salt is less than 1.

35. A process as recited in claim 28 wherein the ore/salt mixture contains less than 8% melt.

36. A process as recited in claim 35 wherein the ore/salt mixture contains less than 5% melt.

37. A process as recited in claim 14 wherein the ore/salt mixture comprises base metals which are selected from the group consisting of: zinc, copper, lead, tin, nickel, iron, cobalt, cadmium, vanadium, manganese, calcium, mangnesium, and molybdenum.

38. A process as recited in claim 37, further comprising:
alcohol leaching the ore/salt mixture after the oxidation step to form an alcohol solution and solids;
separating the ore/salt mixture from the alcohol solution; and
recovering metals from the alcohol solution.

39. A process as recited in claim 38 wherein the alcohol solution comprises base metal chlorides of the group consisting of zinc, copper, iron, cadmium, cobalt, nickel, manganese, calcium, magnesium, or molybdenum.

40. A process as recited in claim 39 wherein the base metals are recovered by contacting the alcohol solution with ammonia gas.

41. A process as recited in claim 39 wherein base metals selected from the group consisting of copper, iron, cadmium, cobalt, or nickel are recovered from the alcohol solution by zinc cementation.

42. A process as recited in claim 41 further comprising recovering zinc by contacting the alcohol filtrate with ammonia gas.

43. A process as recited in claim 39 further comprising brine leaching the solids to recover metals selected from the group consisting of lead or silver.

44. A process as recited in claim 43 wherein the solids are brine leached at a temperature between 60° and 103° C.

45. A process as recited in claim 37 wherein the solid salt is selected from the group consisting potassium chloride or sodium chloride and the molar ratio of formed metal chlorides to solid salt is less than 4.

46. A process as recited in claim 45 wherein the molar ratio of formed metal chlorides to solid salt is less than 2.

47. A process as recited in claim 46 wherein the molar ratio of formed metal chlorides to solid salt is less than 1.

48. A process as recited in claim 44 further comprising separating the solid salt from the brine and recycling the solid salt.

49. A process for recovering base metals from ore or ore concentrates having metal sulfides comprising:
(a) contacting base metal containing ore or ore concentrate having iron or copper with a solid particulate, alkali or alkaline earth metal chloride salt to form an ore/salt mixture of solids wherein the molar ratio of metal chlorides that are formed to solid salt is less than 4;
(b) chlorinating the ore/salt mixture by contacting the ore/salt mixture with chlorine gas at a temperature between 300° and 650° C. wherein the ore/salt mixture contains melted metal chlorides that comprise less than 10% of the ore salt mixture;
(c) evolving sulfur;
(d) ceasing the contact of chlorine gas with the ore/salt mixture from step (b) after substantially all of the metals have formed chlorides;
(e) contacting the ore/salt mixture with an oxygen-containing gas at a temperature between 300° and 650° C.;
(f) alcohol leaching the ore/salt mixture to form an alcohol solution and solid;
(g) separating the alcohol solution from the solids;
(h) separating leached metals from the alcohol solution;
(i) brine leaching the solids at a temperature between 60° and 103° C.; and
(j) separating leached metals from the brine.

50. A process as recited in claim 49 wherein the solid salt is selected from the group consisting of potassium chloride or sodium chloride.

51. A process as recited in claim 49 wherein the molar ratio of metal chlorides that are formed to solid salt is less than 2.

52. A process as recited in claim 51 wherein the molar ratio of metal chlorides that are formed to solid salt is less than 1.

53. A process as recited in claim 49 further comprising separating the solid salt from the brine and recycling the solid salt.

* * * * *